United States Patent
Findeisen et al.

[15] 3,682,916
[45] Aug. 8, 1972

[54] PROCESS FOR THE PRODUCTION OF HALOPYRIMIDINES

[72] Inventors: Kurt Findeisen; Rudolf Braden; Hans Holtschmidt, all of Leverkusen, Germany

[73] Assignee: Farbenfabriken Bayer Aktiengesellschaft, Leverkusen, Germany

[22] Filed: Aug. 5, 1970

[21] Appl. No.: 61,469

Related U.S. Application Data

[63] Continuation of Ser. No. 809,952, March 24, 1969, abandoned, Continuation-in-part of Ser. No. 680,956, Nov. 11, 1967, abandoned.

[30] Foreign Application Priority Data

April 20, 1967 Germany...................F 52 193
July 2, 1968 Germany..........P 17 70 774.3

[52] U.S. Cl. .............................................260/251 R
[51] Int. Cl. ...............................................C07d 51/36

[56] References Cited

UNITED STATES PATENTS 3,389,069 6/1968 Holtschmidt et al. ......260/251

Primary Examiner—Alex Mazel
Assistant Examiner—R. V. Rush
Attorney—Plumley & Tyner

[57] ABSTRACT

Process for producing halopyrimidines by reacting a nitrile or dinitrile and an isocyanide-dichloride in the presence or absence of an inert solvent or diluent and in the presence or absence of an acidic catalyst at a temperature of from 20° to 600° C.

10 Claims, No Drawings

PROCESS FOR THE PRODUCTION OF HALOPYRIMIDINES

This application is a continuation of our earlier filed copending application, Ser. No. 809,952, filed Mar. 24, 1969, now abandoned, which is a continuation-in-part of our earlier filed copending application, Ser. No. 680,956, filed Nov. 11, 1967 now abandoned.

Halopyrimidines are known from the literature. In the previously described processes for their preparation, the synthesis generally proceeds via several steps, a chlorination of the heterocyclic ring being carried out as the last step.

It has now been found that halopyrimidines can be obtained in a new and very simple manner, in one process step, by reacting nitriles of the general formula:

(I) 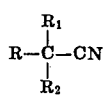

with isocyanide-dichlorides of the general formula:

(II) 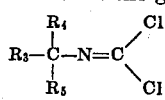

In the general formula (I) and (II), R denotes hydrogen or fluoro; chloro; bromo; nitro; alkyl, such as alkyl groups of 1–22 carbon atoms; aralkyl such as benzyl; cycloalkyl, such as cyclopentyl or cyclohexyl; hydroxy alkyl, particularly those having 1–5 carbon atoms; cyanoalkyl, particularly those having 1–5 carbon atoms; aryl, such as phenyl, diphenyl, and naphthyl; nitrile, alkoxy, particularly those having 1–5 carbon atoms such as methoxy and ethoxy; acyloxy, particularly those having 1–5 carbon atoms; carbalkoxy, particularly those having 1–5 carbon atoms such as carbethoxy; acyl, particularly those having 1–5 carbon atoms such as acetyl; as well as aryl or alkyl groups of the type described containing sulphonyl substituents. $R_1$ and $R_2$ are, independently of one another, hydrogen or fluoro, chloro, or bromo substituents. $R_3$ represents hydrogen or fluoro, chloro, bromo, or alkyl, aralkyl, cycloalkyl, or aryl (as defined for R above) or aromatic-heterocyclic radicals. $R_4$ and $R_5$ are, independently of one another, hydrogen or fluoro, chloro, or bromo substituents, at least two of the radicals R to $R_5$ being fluoro, bromo, or, preferably, chloro substituents, and wherein the alkyl, aralkyl, aryl, and hetero radicals may contain further substituents, such as halogen (e.g. Cl, Br, or F), cyano, hydroxy, alkoxy, or nitro groups.

The starting components (I) and (II) are reacted with one another in approximately stoichiometric proportions or with an excess of one or the other component.

Nitriles of the formula (I) suitable for the process are, for example, acetonitrile, chloroacetonitrile, dichloroacetonitrile, trichloroacetonitrile, bromoacetonitrile, dibromoacetonitrile, tribromoacetonitrile, nitroacetonitrile, dichloro-nitro-acetonitrile, dibromo-nitro-acetonitrile, propionitrile β-chloropropionitrile, butyronitrile, β,γ-dichlorobutyronitrile, α-methyl-α-chlorobutyronitrile, palmitonitrile, ethoxy-dichloroacetonitrile, malodinitrile, methoxyacetonitrile, acetoxyacetonitrile, α-methoxypropionitrile, acetylacetonitrile, benzylcyanide, o-chlorobenzylcyanide, phenylchloro-acetonitrile, phenyl-dichloro-acetonitrile, p-bromobenzylcyanide, o-nitrobenzylcyanide, α-naphthylacetonitrile, β-(p-toluylsulphonyl)-propionic acid nitrile, α-sulphonylacetonitriles, such as methylsulphonyl or ethylsulphonylacetonitrile. It is also possible, of course, to use dinitriles as starting material, such as adipic acid dinitrile.

Isocyanide dichlorides of the formula (II) suitable for the process are, for example, chloromethyl-isocyanide-dichloride, trichloromethyl-isocyanide-dichloride, pentachloro-ethyl-isocyanide-dichloride, methyl-isocyanide-dichloride, dodecyl-isocyanide-dichloride, benzyl-isocyanide-dichloride, substituted benzyl-isocyanide-dichlorides, such as 3,4-dichloro-benzyl-isocyanide-dichloride and 1,1′-dichloro-benzyl-isocyanide-dichloride.

The process according to the invention is carried out in the presence or absence of inert solvents or diluents, advantageously at temperatures between 20° and 600° C; the reaction is preferably carried out at temperatures between 150° and 350° C, and the operation may be effected without pressure or under pressure such as pressures up to 100 atmospheres and optionally in the gas phase. In general, it is advantageous to heat the starting components together in stoichiometric quantities, or to use one of the components as solvent and add the reagents to the heated solvent or other diluent.

As solvents there may be used hydrocarbons, chlorinated hydrocarbons, e.g. methylene chloride, chloroform, carbon tetrachloride, chloroethanes, chloropropanes, straight chain aliphatic or carbocyclic sulfones, which also may be substituted in particular tetramethylenesulfone, further halopyrimidines, such as fluorochloropyrimidines, 2,4,6-trichloropyrimidine, 2,4,6-trichloro-5-chloro-methylpyrimidine, and tetrachloro-pyrimidine, or one of the reaction components.

The reaction can be promoted by acid catalysts. The catalysts include metals or metal salts, such as boron aluminum, zinc, iron cobalt, nickel, antimony, tin, copper, and the salts thereof. Particularly suitable catalysts are those of the Friedel Crafts type. In particular, aluminum chloride, iron-III-chloride, and zinc chloride are used as catalysts.

According to definition, the starting components contain as radicals R to $R_5$ (besides the chloro substituent contained in the group

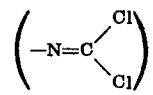

at least two halogen substituents of the aforementioned type, Cl substituents being preferred. According to a particularly preferred method, trichloroacetonitrile or acetonitrile are reacted with trichloromethyl-isocyanide-dichloride at the stated temperatures, preferably within the temperature range of about 150°–350° C, tetrachloropyrimidine or trichloropyrimidine thus being obtained in very good yields. The process according to the invention is, therefore, especially well suited for the preparation of tetrachloropyrimidine from trichloromethyl-isocyanide-dichloride and trichloroacetonitrile, and for the preparation of 2,4,6- trichloropyrimidine from trichloromethyl-isocyanide-dichloride and acetonitrile.

The course of the reaction of the new process is surprising.

The products of the process are known intermediates which are suitable, for example, for the production of reactive dyestuffs.

EXAMPLE 1

43 g trichloromethyl-isocyanide-dichloride and 8.2 g acetonitrile are heated in 100 ml carbon tetrachloride at 250°C for 5 hours in an 0.3 liter-enamel autoclave. The reaction product is subsequently filtered, and the carbon tetrachloride distilled off under normal pressure; the 2,4,6-trichloropyrimidine subsequently distills over at 10 mm Hg and at between 89° and 93°C. Yield: 30 g or 82 percent of the theoretical; m.p. 21°C.

EXAMPLE 2

43 g trichloromethyl-isocyanide-dichloride and 28.8 g trichloroacetonitrile are heated at 300°C for 4 hours in an 0.3 liter-VA-autoclave. The resulting oily tetrachloropyrimidine is roughly distilled in a water jet vacuum and the distillate recrystallized from methanol. Yield: 37.5 g or 86 percent of the theoretical; m.p. 67°C.

EXAMPLE 3

43 g trichloromethyl-isocyanide-dichloride and 17.5 g chloroacetonitrile are heated at 250°C for 4 hours in an 0.3 liter-enamel autoclave. The resulting oil is then distilled in a water jet vacuum. Yield: 31 g or 71 percent of the theoretical, of tetrachloropyrimidine; m.p. 67°C.

EXAMPLE 4

16.2 g of 4-nitrobenzylcyanide, 21.5 g of trichloromethyl-isocyanide-dichloride, 0.5 g of iron-III-chloride and 100 ml of carbon tetrachloride are heated in an 0.3 liter-enamel autoclave at 250°C for 2 hours. After cooling, the carbon tetrachloride is distilled off under normal pressure and the residue recrystallized from gasoline for cleaning. The 2,4,6-trichloro-5-(p-nitrophenyl)-pyrimidine thus obtained has a melting point of 172°-176°C.

| (Weight %) | C | H | N | Cl |
|---|---|---|---|---|
| Calculated: | 39.44 | 1.32 | 13.80 | 34.93 |
| Found: | 39.72 | 1.59 | 13.45 | 34.65 |

EXAMPLE 5

129 g of trichloromethyl-isocyanide-dichloride, 33 g of propionitrile, and 300 g of carbon tetrachloride are heated in an 0.7 liter-nickel autoclave in the presence of catalytic amounts of iron-III-chloride for 1 hour at 200°C and for 1 hour further at 250°C. The pressure in the reaction vessel is maintained at about 25 atmospheres gauge pressure. After completion of the reaction, the reaction mixture is filtered and the solvent distilled off under normal pressure. The residue is recrystallized from ethanol. 51.5 g of 2,4,6-trichloro-5-methylpyrimidine are thus obtained (61 percent of the theoretical yield). M.p. 68°C. Literature m.p. 67°–68°C.

EXAMPLE 6

43 g of trichloromethyl-isocyanide-dichloride and 17.8 g of 3-chloropropionitrile are dissolved in 100 ml of carbon tetrachloride and heated in an 0.3 liter-nickel autoclave for 3 hours at 230°C. After cooling, the reaction mixture is filtered with suction and the solvent distilled off. The residue is recrystallized from acetonitrile and 2,4,6-trichloro-5-chloromethyl-pyrimidine thus obtained. M.p. 103°–105°C.

| (Weight %) | C | H | N | Cl |
|---|---|---|---|---|
| Calculated: | 25.90 | 0.87 | 12.08 | 61.16 |
| Found: | 26.10 | 1.01 | 11.95 | 61.0 |

EXAMPLE 7

11.7 g of benzylcyanide and 21.5 g of trichloromethylisocyanide-dichloride are dissolved in 100 ml of carbon tetrachloride and heated in a shaking autoclave in the presence of 0.5 g of iron-III-chloride for 2 hours at 230°C. After cooling and filtration, the solvent is distilled off under normal pressure and the residue thus obtained pasted with petroleum ether. After filtration, the solid product is recrystallized from ethanol. 2,4,6-trichloro-5-phenylpyrimidine is obtained in a yield of 16.4 g (63 percent of the theoretical yield, m.p. 159°C.

| (Weight %) | C | H | N | Cl |
|---|---|---|---|---|
| Calculated: | 46.30 | 1.94 | 10.80 | 41.0 |
| Found: | 46.60 | 2.19 | 10.8 | 40.72 |

EXAMPLE 8

A stirrer-type vessel is filled with 380 parts by weight of tetramethylene sulfone and 5 parts by weight of iron-III-chloride. The mixture is heated to 220°C and a solution of 654 parts by weight of trichloromethylisocyanide-dichloride, 135 parts by weight of acetonitrile, and 9 parts by weight of iron-III-chloride are added dropwise within 2½ hours. A vigorous evolution of HCl takes place. The temperature drops to 165°C. The mixture is then heated up to 200°C. By distilling the reaction mixture via a column, 480 parts by weight of the reaction product of the boiling point 90°–105°C/15 mm Hg; $n_{20}^{D}$ : 1.5687 are obtained. 98.5 percent of this fraction consist of 2,4,6-trichloropyrimidine corresponding to a yield of 85 percent of the theoretical.

EXAMPLE 9

150 parts by weight of tetrachloropyrimidine and 2.5 parts by weight of iron-III-chloride are heated to 200°C. A solution of 218 parts by weight of trichloromethyl-isocyanide-dichloroide, 75.5 parts by weight of monochloroacetonitrile and 4 parts by weight of iron-III-chloride are added dropwise within 1 hour. The mixture is stirred at 200°C for a further 15 minutes. The reaction mixture is distilled in a vacuum; 346 parts by weight tetrachloropyrimidine are obtained. Boiling point: 105°–112°C/25 mm Hg; melting point: 64°C; yield: 90 percent of the theoretical.

EXAMPLE 10

108 parts by weight of trichloromethylisocyanide-dichloride, 98 parts by weight of 3,4-dichlorobenzyl-cyanide, 500 parts by weight of carbon tetrachloride, and 0.5 parts by weight of iron-III-chloride are heated to 250°C for 1 hour in a nickel autoclave. The resulting HCl is released from pressure via a cooler within a pressure interval of 30–50 atmospheres. After distilling off the solvent of the reaction yields 180 parts by weight of the residue from which 86 parts by weight of 2,4,6-trichloro-5-(3,4-dichlorophenyl)-pyrimidine having a melting point of 141°C are obtained after recrystallization from ligroin.

| Analysis: | Nitrogen | Chlorine |
|---|---|---|
| Calculated: | 8.6% | 54.0% |
| Found: | 8.8% | 54.0% |
|  | 8.9% | 54.1% |

EXAMPLE 11

150 parts by weight of 2,3,4-trichlorobenzyl-cyanide and 103 parts by weight of trichloromethylisocyanide-dichloride are reacted in carbon tetrachloride in the presence of iron-III-chloride as described in the preceding Example. 2,4,6-trichloro-5-(2,3,4-trichlorophenyl)-pyrimidine is obtained of the melting point 198°–200°C.

| Analysis: | Nitrogen | Chlorine |
|---|---|---|
| Calculated: | 7.7% | 58.6% |
| Found: | 7.5% | 57.9% |
|  | 7.7% |  |

Example 12

200 g of 2,4,6-trichloropyrimidine and 5 g of iron-III-chloride are heated to 205°C in a four-necked flask equipped with a dropping funnel, a high-speed cooler, a stirrer, and a stopper. Within 1 hour, a mixture of 1 mol of trichloromethylisocyanide-dichloride (215 g) and 1 mol of acetonitrile (41 g) is introduced per hour dropwise into the four-necked flask. The temperature does not drop below 200°C. After the 500 ml flask is filled, the mixture is stirred for 15 minutes while interrupting the dropwise addition of the aforesaid mixture, the inside temperature rising to 210°C. Half the quantity of 2,4,6-trichloropyrimidine is filtered off with suction while hot through the neck of the flask which is equipped with a stopper, and the dropwise addition is then continued. When the reaction speed becomes too low, further iron-III-chloride must be added. After the addition of 1,935 g of trichloromethylisocyanide-dichloride and 369 g of acetonitrile (9 mols), the reaction is finished. In total, 45 g of iron-III-chloride are successively added which correspond to 5 g of iron-III-chloride per mol of trichloromethylisocyanide-dichloride. The 200 g of 2,4,6-trichloropyrimidine used are recovered.

Yield: 1,375 g of 2,4,6-trichloropyrimidine = 82 percent of the theoretical boiling point: 89°–93°C/10 mm Hg.

EXAMPLE 13

300 g of tetrachloro-pyrimidine are placed in 1.5 liter three-necked flask equipped with a dropping funnel, a stirrer, and a high-speed cooler and heated to 210°C (inside temperature) after the addition g 5 g of iron-III-chloride.

A mixture of 430 g of trichloromethyl-isocyanide-dichloride (2 mols) and 82 g of acetonitrile (2 mols) are added dropwise within 3 hours. After the addition of 5 g of iron-III-chloride further 2 mols (430 g of trichloromethyl-isocyanide-dichloride and 82 g of acetonitrile) are added within another 3 hours. The inside temperature does not drop below 205°C. The mixture is stirred for a further 15 minutes and the reaction mixture is distilled in a vacuum.

951 g of a distilled product are obtained; 300 g are tetrachloropyrimidine used, 635 g of 2,4,6-trichloropyrimidine and 17 g of trichloromethylisocyanide-dichloride are produced.

Yield: 635 g of 2,4,6-trichloropyrimidine = 88 percent of the theoretical; boiling point: 89°–93°C/10 mm Hg.

EXAMPLE 14

In a three-necked flask, 150 g of tetrachloropyrimidine and 3 g of iron-III-chloride are heated to 150°C with stirring and a mixture of 107.5 g of trichloromethyl-isocyanide-dichloride and 81 g of p-nitrobenzyl-cyanide are added, and the mixture is heated to 210°C for 2 hours. The reaction mixture is then distilled. 150 g of tetrachloro-pyrimidine are recovered, and 108 g of 2,4,6-trichloro-5-(p-nitrophenyl)-pyrimidine result.

Yield: 108 g = 72 percent of the theoretical;
Melting point: 187°–188°C from ligroin;

| Analysis: | C | H | N | Cl |
|---|---|---|---|---|
| Calculated: | 39.44 | 1.32 | 13.80 | 34.93 |
| Found: | 39.51 | 1.35 | 13.62 | 34.98 |

Molecular weight calculated: 304.54
Molecular weight found: 305

EXAMPLE 15

In a three-necked flask, 3 g of iron-III-chloride and 150 g of tetrachloropyrimidine are heated to 210°C and a mixture of 107.5 g of trichloromethylisocyanide-dichloride and 58.5 g of benzylcyanide is added dropwise within 1 hour. The temperature does not drop below 200°C. The mixture is stirred at 205°C for a further 30 minutes. The resulting reaction mixture is distilled; 150 g of tetrachloropyrimidine are recovered, the crude reaction product distills between the boiling point 130°–160°C at 0.3 mm Hg.

Yield: 71 g of 2,4,6-trichloro-5-phenyl pyrimidine = 57 percent of the theoretical (from ligroin)
Melting point: 158°–159°C

| Analysis: | C | H | N | Cl |
|---|---|---|---|---|
| Calculated: | 46.30 | 1.94 | 10.80 | 41.0 |
| Found: | 46.23 | 1.87 | 11.05 | 41.25 |

Molecular weight calculated: 259.54
Molecular weight found: 261.

EXAMPLE 16

300 g of trichloropyrimidine and 5 g of iron-III-chloride are introduced into a three-necked flask and heated to 210°C. A mixture of 430 g of trichloromethyl-isocyanide-dichloride and 178 g of 3-chloropropionitrile are then added dropwise within 4 hours. The inside temperature is kept between 205° and 210°C. After the dropwise addition is finished, the mixture is stirred for another 30 minutes and the content of the flask is distilled in a water jet vacuum. The 300 g of trichloropyrimidine used are recovered.

Yield: 344 g of 2,4,6-trichloro-5-chloromethyl pyrimidine = 74 percent of the theoretical;
Melting Point: 112°C from ligroin;

| Analysis:   | C     | H    | N     | Cl    |
|-------------|-------|------|-------|-------|
| Calculated: | 25.90 | 0.87 | 12.08 | 61.16 |
| Found:      | 25.84 | 0.83 | 12.35 | 61.20 |

EXAMPLE 17

123 g of 2,4,6-trichloro-5-chloromethylpyrimidine and 5 g of iron-III-chloride are heated to 210°C while stirring, and a mixture of 215 g of trichloromethyl-isocyanide-dichloride and 89.5 g of 3-chloropropionitrile is added dropwise within 1 hour. After stirring for another 30 minutes, the reaction product is recrystallized from liqroin, 123 g of 2,4,6-trichloro-5-chloromethyl-pyrimidine used are recovered.
Yield: 152 g of 2,4,6-trichloro-5-chloromethylpyrimidine = 65 percent of the theoretical;
Melting point: 112°C.

The halopyrimidines formed by the present invention may be reacted with, for example, azo phthalocyanine or anthraquinone dyestuffs containing hydroxyl, thiol, or amino substitutents to yield halopyrimidyl containing organic dyestuffs suitable for use in dyeing, padding, or printing fibers, yarns, or fabrics containing natural or regenerated cellulose and other textiles. Such methods of use are described in U.S. Pat. No. 2,935,506, Belgian Pat. specification No. 572,973, and British Pat. specification Nos. 902,618, 903,727, and 916,094.

We claim:

1. A process for the production of halopyrimidines which comprises reacting a nitrile of the formula

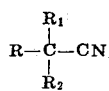

in which R denotes hydrogen; chlorine; bromine; alkyl with 1–22 carbon atoms which may be substituted by chloro or cyano; benzyl which may be substituted by chloro, bromo or nitro; phenyl; naphthyl; nitro; cyano; alkoxy with 1–5 carbon atoms; acyl with 1–5 carbon atoms; acyloxy with 1–5 carbon atoms; alkylsulfonyl with 1–5 carbon atoms; and $R_1$ and $R_2$ independently of one another represent hydrogen, fluorine, chlorine or bromine substituents, with an isocyanide dichloride of the formula

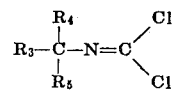

in which $R_3$ denotes hydrogen; chlorine; alkyl with 1–22 carbon atoms which may contain a chloro substituent; and benzyl which may contain a chloro substituent; and $R_4$ and $R_5$ are independently of one another hydrogen or fluorine, chlorine or bromine substituents; at least two of the radicals R to $R_5$ being fluorine, bromine, or chlorine substituents; at a temperature of from about 20° to 350°C in the presence or absence of one or more inert solvent or diluent.

2. Process according to claim 1 which comprises carrying out the reaction at a temperature of from 150° to 350°C.

3. Process according to claim 1 wherein a solvent or diluent is used selected from the group consisting of halopyrimidines, substituted or unsubstituted straight chain aliphatic or carbocylic sulfones, hydrocarbons, and chlorinated hydrocarbons.

4. Process according to claim 1 which comprises reacting a chlorinated alkyl-isocyanide-dichloride with acetonitrile.

5. Process according to claim 1 which comprises reacting a chlorinated alkyl-isocyanide-dichloride with a chlorinated acetonitrile.

6. Process according to claim 1 which comprises reacting trichloromethyl-isocyanide-dichloride and trichloroacetonitrile at a temperature of from about 150° to about 350°C to give tetrachloropyrimidine.

7. Process according to claim 1 which comprises reacting acetonitrile with trichloromethyl-isocyanide-dichloride at a temperature of from about 150° to 350°C to give 2,4,6-trichloropyrimidine.

8. Process according to claim 1 which comprises reacting an isocyanide-dichloride with adipic acid dinitrile.

9. Process according to claim 1 wherein R is a member selected from the group consisting of cyano and cyano-alkyl containing 1–23 carbons.

10. Process of claim 1 wherein a Friedel Crafts catalyst selected from the group consisting of aluminum chloride, zinc chloride and iron-III-chloride is used.

* * * * *